United States Patent [19]

Tuegel

[11] 4,058,694
[45] Nov. 15, 1977

[54] MASTER CYLINDER RESERVOIR WITH VACUUM RELIEF DIAPHRAGM AND GUARDED FLUID LEVEL SENSOR

[75] Inventor: Robert O. Tuegel, St. Louis County, Mo.

[73] Assignee: Wagner Electric Corporation, Parsippany, N.J.

[21] Appl. No.: 637,643

[22] Filed: Dec. 4, 1975

[51] Int. Cl.² .............................................. H01H 35/18
[52] U.S. Cl. ................................... 200/84 C; 73/408; 200/83 L
[58] Field of Search .................. 73/308, 403; 340/240, 340/244; 200/84 R, 84 B, 84 C, 83 L, 83 W, 61.2

[56] References Cited

U.S. PATENT DOCUMENTS

| | | | |
|---|---|---|---|
| 2,907,844 | 10/1959 | Lindsey | 200/61.2 |
| 3,208,645 | 8/1965 | Levins | 200/84 C |
| 3,260,815 | 7/1966 | Trimmer | 200/84 R |
| 3,931,485 | 1/1976 | Spielfiedel | 73/308 |
| 3,985,985 | 10/1976 | Harwick | 73/403 |

Primary Examiner—Gerald P. Tolin
Attorney, Agent, or Firm—Eyre, Mann, Lucas & Just

[57] ABSTRACT

A brake fluid reservoir includes a main body portion having a cap securing a diaphragm between the body and the cap. A sensor is mounted to protrude into the reservoir for indicating a predetermined minimum level of brake fluid in the reservoir. The diaphragm is provided for corresponding movement in response to decreases in the level of brake fluid in the reservoir and also for separating a brake fluid containing portion of the reservoir from an air containing portion. The diaphragm includes an interstice for permitting air in the air containing portion to be drawn into the fluid containing portion under preselected conditions. A protective device surrounds the sensor for maintaining the movement of the diaphragm from interfering engagement with the sensor. The brake fluid reservoir may be used in a vehicle brake system including a master cylinder connected for fluid communication with the reservoir and with the front and rear brakes of the vehicle.

11 Claims, 7 Drawing Figures

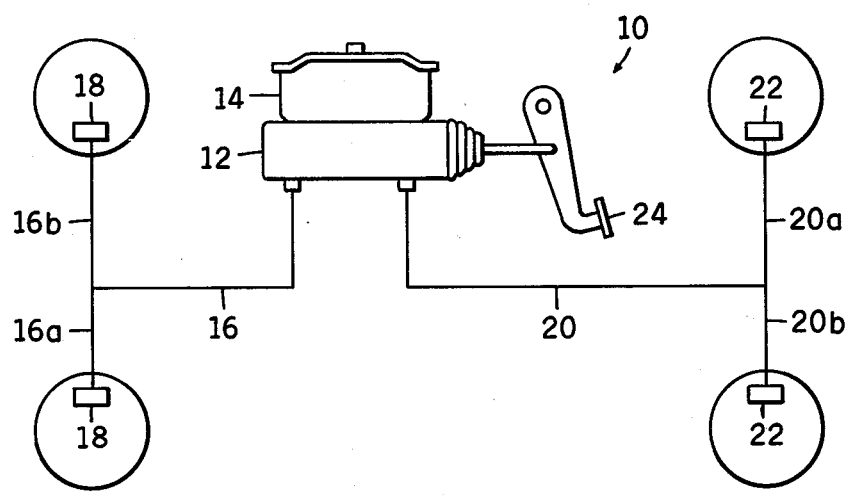
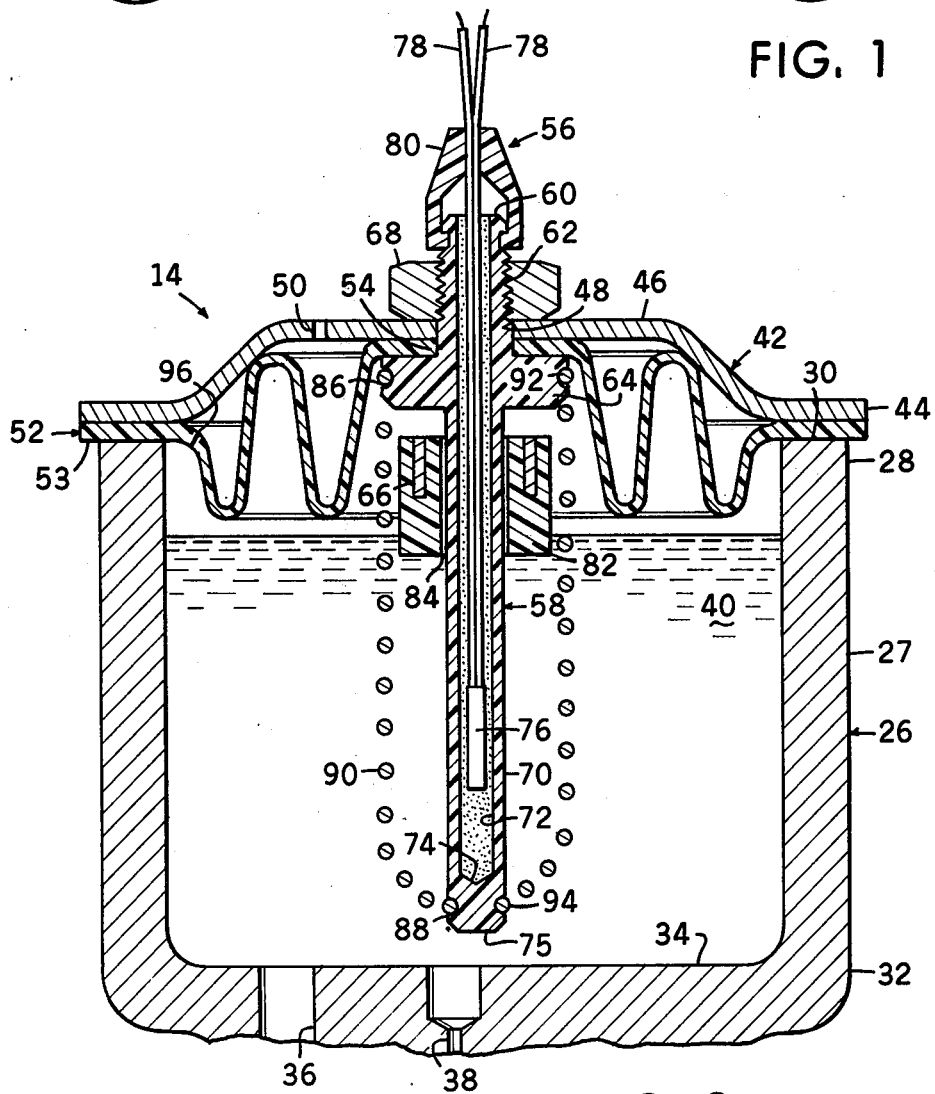
FIG. 1
FIG. 2

MASTER CYLINDER RESERVOIR WITH VACUUM RELIEF DIAPHRAGM AND GUARDED FLUID LEVEL SENSOR

BACKGROUND OF THE INVENTION

1. Field Of The Invention

This invention pertains generally to brakes and more particularly to safety devices for fluid pressure operated brakes.

2. Discussion Of The Prior Art

Vehicular hydraulic brake systems typically include a master cylinder operative in response to force applied to a brake pedal by the vehicle operator. A reservoir, usually included as part of the master cylinder, retains an excess of brake fluid to be used in the system. The brake fluid, being a substantially noncompressible fluid, acts to distribute pressure throughout the system when the brake pedal is actuated. Factors such as wear on the brake pads or brake shoes due to repeated braking applications ultimately require added amounts of fluid in the system. Thus, the level of fluid in the reservoir is gradually lowered as the system requires more and more fluid. A diaphragm, placed in the reservoir aids in limiting contamination of the fluid due to dirt and other foreign matter which could impede or impain the system function and also as the fluid level in the reservoir is lowered, the diaphragm extends downward with the fluid level so as to correspondingly displace the volume of fluid leaving the reservoir.

Fluid level sensors are often used to indicate a predetermined minimum level of fluid in such reservoirs. One such sensor is immersed into the fluid and includes a float member which follows the fluid level. Thus the float must be free to move in the reservoir in order to maintain a fixed position relative to the lowering fluid level. Diaphragms, such as hereinabove described can interfere with the movement of the float member and if so will render the sensor unreliable. Also, with space in the reservoir being limited due to the presence of the sensor, the diaphragm is limited in its ability to move correspondingly in order to displace the fluid leaving the reservoir. Thus, further lowering of the fluid level without a corresponding extension of the diaphragm can cause an undesirable vacuum condition to exist in the reservoir which can prevent the brake system from drawing further amounts of fluid from the reservoir. It would be of benefit, therefore, to provide such a reservoir with a non-vacuum creating and non-float interferring relationship between the fluid level, the sensor and the diaphragm so as to avoid the abovementioned undesirable conditions.

SUMMARY OF THE INVENTION

It has been found, according to the present invention, that a novel solution to the aforementioned undesirable conditions can be provided. The foregoing is accomplished by providing a brake fluid containing reservoir, adaptable to a hydraulic brake system, which includes a main body portion and an attached cap securing a diaphragm between the body and the cap. A sensor may be secured to protrude into the reservoir so as to be immersed in the brake fluid. The diaphragm is provided to correspondingly move in response to decreases in the level of the brake fluid and also for separating a portion of the reservoir containing brake fluid and some air (hereinafter referred to as the brake fluid containing portion) from a portion of the reservoir adjacent the cap containing air at atmospheric pressure (herein after referred to as the air containing portion). The diaphragm includes an interstice for permitting air in the air containing portion to be drawn into the brake fluid containing portion under preselected conditions. Also, a protective device may be provided to surround the sensor for maintaining the movement of the diaphragm from interferring engagement with the sensor. Also, the diaphragm of this invention is not limited to use only in reservoirs using sensors since this diaphragm is proposed to avoid the heretofore known undesirable vacuum conditions which can exist in brake fluid reservoirs.

Other advantages and novel features of this invention will become apparent from the following detailed description of the invention when considered in conjunction with the accompanying drawings.

BRIEF DESCRIPTION OF THE DRAWINGS

In the drawings wherein like parts are marked alike:

FIG. 1 illustrates a simplified diagrammatic view of a hydraulic brake system;

FIG. 2 illustrates a cross-sectional side elevation of a portion of the reservoir of the invention having a raised fluid level;

DESCRIPTION OF THE PREFERRED EMBODIMENT

Figure 3:
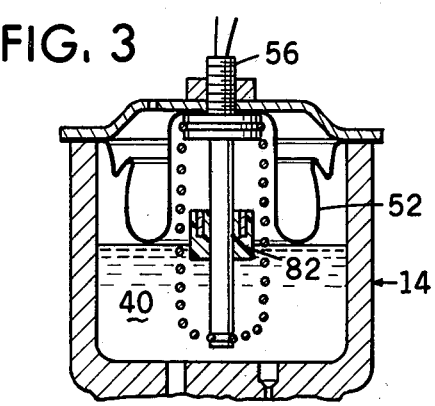
FIG. 3 graphically illustrates a cross-sectional side elevation of the reservoir of this invention having a lowered fluid level and a fully extended diaphragm.

Referring now to the drawings, FIG. 1 generally illustrates a simplified diagrammatic view of a hydraulic brake system designated 10. Tandem master cylinder 12 is connected for fluid communication with two brake fluid reservoirs formed in a single reservoir housing 14. However, inasmuch as the reservoirs are similar, only one will be shown and discussed. Conduit 16 fluidly connects master cylinder 12 with front brake wheel cylinders 18 via branch conduits 16a, 16b whereas conduit 20 fluidly connects the master cylinder with rear brake wheel cylinders 22 via branch conduits 20a, 20b. When force is applied to foot pedal 24 by a vehicle operator, the fluid transmits the pressure to the vehicle brakes.

FIG. 2 illustrates reservoir housing 14 which includes main body portion 26 preferably cast of iron or some other suitable material having side walls 27 which may be annular or of any suitable geometric shape. Top end 28 terminates at 30 forming an opening whereas bottom end 32 terminates at end wall 34 including replenishing port 36 and vent port 38 for fluid communication with master cylinder 12 not shown. Given this basic configuration it can be seen in FIG. 2 that the main body portion provides an adequate retainer for fluid such as hydraulic brake fluid 40 as is well known.

Cap 42 shown mounted on main portion 26 is preferably of steel and is formed with a flange portion 44 and a dome-like portion 46. An opening 48 is provided in the dome-like portion 46 for accommodating a fluid level sensor to be discussed later in greater detail. Flange portion 44 is provided for alignment with top end 28 of main body portion 26 as is well known. A vent or port 50 may be provided in cap 42 to communicate the reservoir to atmosphere.

Diaphragm 52 is preferably of rubber or some suitable resilient synthetic material. The diaphragm is sealingly secured in the reservoir at outer periphery 53 between cap 42 and main body portion 26 such as between top end 28 and flange 44. Diaphragm 52 is convoluted to permit extension thereof downward into main body portion 26 as is well known. Inner periphery 54 is secured between cap 42 and the sensor adjacent opening 48 of the cap.

Figure 5:
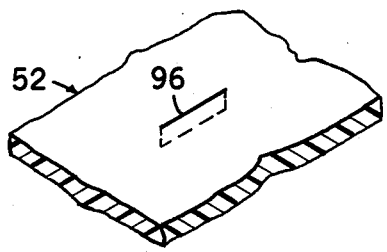
FIG. 5 illustrates an isometric view of a portion of the diaphragm including a slit or interstice formed therein.

A novel inclusion in diaphragm 52 is provided at slit or interstice 96 provided in a portion of diaphragm 52 inside reservoir 14 in the vicinity of the portion of the diaphragm secured between flange 44 of cap 42 and top end 28 of main body portion 26. Slit 96 remains closed due to the inherent resilience of the diaphragm material and is provided to open when a substantial pressure difference exists across diaphragm 52, see FIGS. 2 and 5.

A well known sensor 56 is provided for mounting on the reservoir so as to protrude thereinto to indicate a predetermined minimum level of brake fluid in the reservoir. Main portion 58 of sensor 56 is generally of plastic and includes a first end 60 having a threaded extension 62 for extending through dome portion 46. Flange 64 secures inner periphery 54 of diaphragm 52 against dome portion 46 adjacent opening 48 due to tightening nut 68 threadedly received by threaded extension 62. An elongated extended portion 70 extends downward into the reservoir from flange 64 and includes cavity 72 extending from open first end 60 downward to terminate at cavity end wall 74 adjacent sensor second end 75, as viewed in FIG. 2. A well known magnetically actuated electric switching element 76 is secured in cavity 72 by an epoxy filler or the like and is connected to a warning device (not shown) external to the sensor 56 by wires 78, as is well known. A sealing boot 80 is mounted adjacent first end 60 to seal the exposed open first end 60. A plastic or other suitable synthetic material is used to form a doughnut-shaped float 82 having opening 84 formed therethrough to be slidably accommodated by elongated extended portion 70. Float 82 includes magnetic elements 66 imbedded therein to cooperatingly actuate element 76 when in proximity therewith so as to indicate a predetermined minimum level of fluid in the reservoir.

A novel inclusion in sensor 56 is provided comprising a first annular groove 86 formed in the outer annular periphery of flange 46 adjacent first end 60 and a second annular groove 88 in elongated extended portion 70 adjacent second end 75. Coil spring 90, preferably of spring steel, is substantially of uniform diameter as it extends downward from first end 92 accommodated by flange groove 86 and then diminishes in diameter at second end 94 to be accommodated by groove 88. The spring is great enough in both diameter and length to permit free movement of float 82 substantially along the length of extended portion 70 into ultimate proximity with element 76 so as to cage float 82 from interferring engagement with diaphragm 52 as illustrated by FIGS. 2, 3 and 4.

FIG. 3 graphically illustrates a portion of reservoir housing 14 including the downwardly extended diaphragm 52 to cojrespondingly displace the fluid 40 leaving the reservoir. Also, float member 82 is illustrated as correspondingly following the fluid level.

Figure 4:
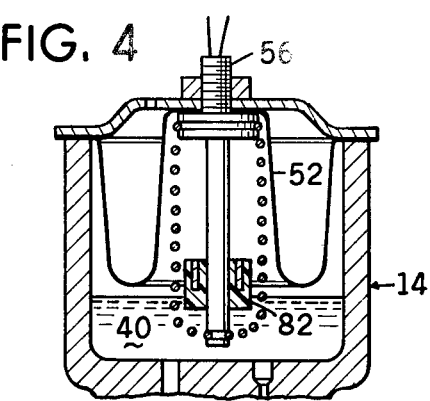
FIG. 4 graphically illustrates a cross-sectional side elevation of the reservoir of this invention having a further lowered fluid level beyond the full extension capabilities of the diaphragm.

FIG. 4, graphically illustrates a portion of reservoir housing 14 including the further downwardly extending diaphragm 52. However, since some of the space in reservoir housing 14 is occupied by sensor 56, diaphragm 52 is limited in its ability to displace all or practically all of the fluid leaving the reservoir. Thus, further lowering of the level of fluid 40 without a corresponding displacement by diaphragm 52 can cause an undesirable vacuum condition to exist in the reservoir. Of course, such condition can be preselectively controlled in view of varying the diaphragm parameters. However, due to the inclusion of interstice 96 in diaphragm 52 the sealing effect of the diaphragm can be removed under such conditions as the diaphragm attempts to extend downwardly in accordance with the fluid level. Under these conditions a potential vacuum condition can exist in the brake fluid containing portion of the reservoir whereas the air containing portion remains substantially at atmospheric pressure. Thus a pressure differential may exist across diaphragm 52 sufficient to cause interstice 96 to open thus permitting air to pass therethrough from the air containing portion of the reservoir to the brake fluid containing portion.

Figure 6:
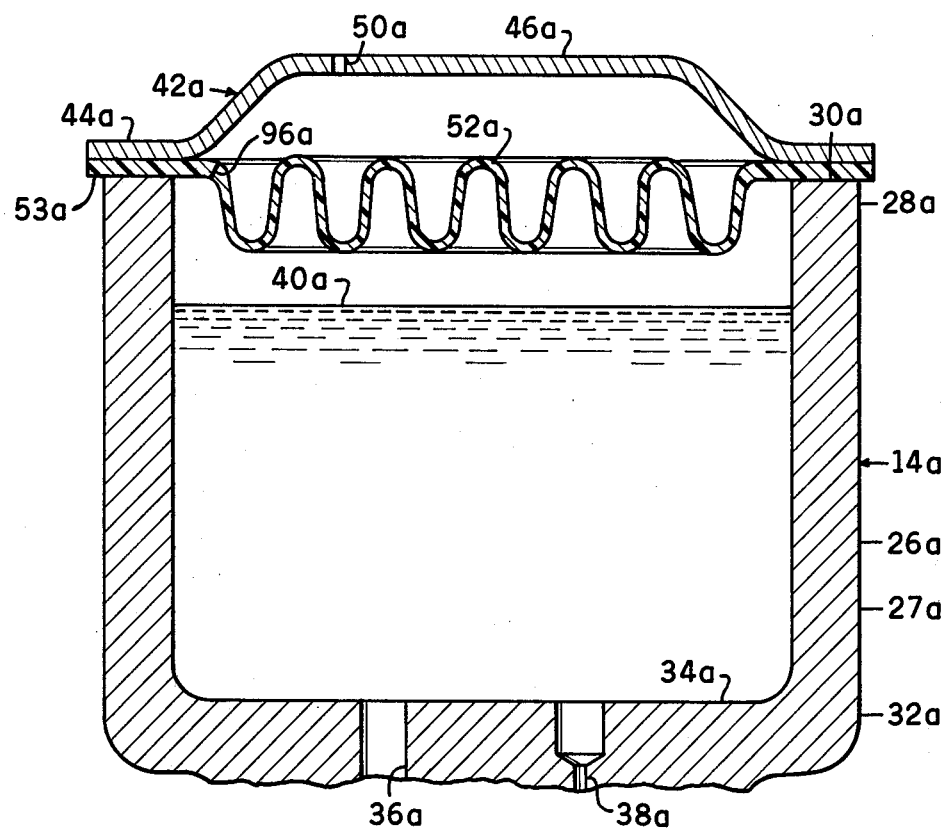
FIG. 6 illustrates a cross-sectional side elevation of a portion of an alternative reservoir of the invention having a raised fluid level.

In the alternative, FIG. 6 illustrates reservoir housing 14a which includes main body portion 26a preferably of cast iron or some other suitable material having side walls 27a which may be annular or of any suitable geometric shape. Top end 28a terminates at 30a forming an opening whereas bottom end 32a terminates at end wall 34a including replenishing port 36a and vent port 38a for communication of fluid 40a with master cylinder 12 not shown.

Cap 42a shown mounted on main portion 26a is preferably of steel and is formed with a flange portion 44a and a dome-like portion 46a. Flange portion 44a is provided for alignment with top end 28a of main body portion 26a as is well known. A vent or port 50a may be provided in cap 42a to communicate the reservoir to atmosphere.

Diaphragm 52a is preferably of rubber or some suitable resilient synthetic material. The diaphragm is sealingly secured in the reservoir at outer periphery 53a between cap 42a and main body portion 26a such as between top end 28a and flange 44a. Diaphragm 52a is convoluted to permit extension thereof downward into main body portion 26a as is well known.

A novel inclusion in diaphragm 52a is provided at slit or interstice 96a provided in a portion of diaphragm 52a inside reservoir 14a in the vicinity of the portion of the diaphragm secured between flange 44a of cap 42a and top end 28a of main body portion 26a. Slit 96a remains closed due to the inherent resilience of the diaphragm material and is provided to open when a substantial pressure difference exists across diaphragm 52a.

Figure 7:
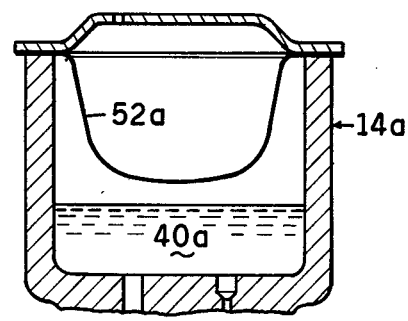
FIG. 7 graphically illustrates a cross-sectional side elevation of the reservoir of FIG. 6 having a lowered fluid level and a fully extended diaphragm.

FIG. 7 graphically illustrates a portion of reservoir 14a including fully downwardly extended diaphragm 52a. However, in certain instances such as where the number of permissible convolutions in the diaphragm may be limited due to space limitations or other factors in the reservoir, diaphragm 52a is limited in its ability to displace all or practically all of the fluid leaving the reservoir. Thus, further lowering of the level of fluid 40a without a corresponding displacement by diaphragm 52a can cause an undesirable vacuum condition to exist in the reservoir. Of course, as stated before, such condition can be preselectively controlled in view of varying the diaphragm parameters. However, due to the inclusion of interstice 96a in diaphragm 52a, the sealing effect of the diaphragm can be removed under such conditions as the diaphragm attempts to extend downwardly in accordance with the fluid level. Under these conditions a potential vacuum condition can exist in the brake fluid containing portion of the reservoir whereas the air containing portion remains substantially at atmospheric pressure. Thus, a pressure differential may exist across diaphragm 52a sufficient to cause interstice 96a to open thus permitting air to pass therethrough from the air containing portion of the reservoir to the brake fluid containing portion.

In operation, the brake fluid level in the reservoir is gradually lowered as the system requires additional amounts of fluid due to factors such as wear on the brake pads or shoes. Diaphragm 52 gradually extends downwardly with the fluid level so as to correspondingly displace the volume of fluid leaving the reservoir.

As the fluid level decreases, float member 82 correspondingly moves downwardly along extended portion 70 of sensor 56. Due to the caged relationship of float member 82 with respect to diaphragm 52, the float member is permitted to move downwardly along extended portion 70 without experiencing interferring engagement with downwardly moving diaphragm 52.

Once the diaphragm is fully extended downwardly into the reservoir, an undesirable pressure differential across the diaphragm is avoided due to the flexible and resilient nature of the diaphragm material to permit opening of interstice 96 thus permitting atmospheric air to pass therethrough into the brake fluid containing portion from the air containing portion. Once the pressure differential across the diaphragm diminishes, the resilience of the diaphragm material permits the interstice to close.

The foregoing has described a novel brake fluid reservoir capable of providing a non-vacuum creating and non-float interferring relationship between the fluid level, sensor and diaphragm therein.

Obviously, other modifications and variations of the present invention are possible in the light of the above teachings. It is therefore to be understood that within the scope of the appended claims the invention may be practiced otherwise than as specifically described.

What is claimed is:

1. A brake fluid reservoir comprising:
   a main body portion;
   a cap mounted on the main body;
   brake fluid level sensor means mounted on the reservoir and protruding thereinto for indicating a predetermined minimum level of brake fluid in the reservoir;
   said fluid level sensor including float means for floating on the surface of the brake fluid;
   diaphragm means sealingly secured in the reservoir for corresponding movement in response to a decrease in the level of brake fluid containing portion of the reservoir from an air containing portion;
   means surrounding the float means for maintaining the movement of the diaphragm from interfering engagement with the movement of the float means;
   said brake fluid level sensor means being:
   an elongated portion;
   said float means being movably mounted on the elongated portion and buoyant in the brake fluid responsive for maintaining a constant position with respect to the level of the brake fluid in the reservoir;
   said means surrounding the brake fluid level sensor means being:
   coil means mounted on the sensor and concentrically spaced around the elongated portion and the float means for permitting movement of the float relative to the elongated portion and for maintaining the movement of the diaphragm spaced from the elongated portion and from the float means.

2. The brake fluid reservoir of claim 1 comprising:
   the diaphragm including interstice means formed therein for permitting air in the air containing portion of the reservoir to be drawn into the fluid containing portion under preselected conditions.

3. A brake fluid reservoir comprising:
   a main body portion;
   a cap mounted on the main body;
   brake fluid level sensor means mounted on the reservoir and protruding thereinto for indicating a predetermined minimum level of brake fluid in the reservoir;
   diaphragm means sealingly secured in the reservoir for corresponding movement in response to a decrease in the level of brake fluid in the reservoir and for separating a brake fluid containing portion of the reservoir from an air containing portion;
   the diaphragm including normally closed interstice means formed therein said interstice means being openable for permitting air in the air containing portion of the reservoir to be drawn into the fluid containing portion under preselected conditions; and
   said preselected conditions being a difference in pressure between the two sides thereof.

4. The brake fluid reservoir of claim 3 wherein the brake fluid level sensor means comprises:
   an elongated portion; and
   float means movably mounted on the elongated portion and buoyant in the brake fluid responsive for maintaining a constant position with respect to the level of the brake fluid in the reservoir.

5. The brake fluid reservoir of claim 4, and further including:
   means mounted on the sensor and concentrically spaced around the elongated portion and the float means for permitting movement of the float relative to the elongated portion and for maintaining the movement of the diaphragm spaced from interferring engagement with the elongated portion and the float means.

6. In a vehicle brake system of the type including a master cylinder and a brake fluid reservoir in fluid communication therewith, an improvement comprising:
   a main body portion of the reservoir;
   a cap mounted on the main body;
   brake fluid level sensor means mounted on the reservoir and protruding thereinto for indicating a predetermined minimum level of brake fluid in the reservoir;
   said fluid level sensor including float means for floating on the surface of the brake fluid;
   diaphragm means sealingly secured in the reservoir for corresponding movement in response to a decrease in the level of brake fluid in the reservoir and for separating a brake fluid containing portion of the reservoir from an air containing portion;

means surrounding the float means for maintaining the movement of the diaphragm from interfering engagement with the movement of the float means;

said brake fluid level sensor means being:

an elongated portion;

said float means being movably mounted on the elongated portion and buoyant in the brake fluid responsive for maintaining a constant position with respect to the level of the brake fluid in the reservoir;

said means surrounding the brake fluid level sensor means being:

coil means mounted on the sensor and concentrically spaced around the elongated portion and the float means for permitting movement of the float relative to the elongated portion and for maintaining the movement of the diaphragm spaced from the elongated portion and from the float means.

7. The system of claim 6 comprising:

the diaphragm including interstice means formed therein for permitting air in the air containing portion of the reservoir to be drawn into the fluid containing portion under preselected conditions.

8. In a vehicle brake system of the type including a master cylinder and a brake fluid reservoir in fluid communication therewith, an improvement comprising:

a main body portion of the reservoir;

a cap mounted on the main body;

brake fluid level sensor means mounted on the reservoir and protruding thereinto for indicating a predetermined minimum level of brake fluid in the reservoir;

diaphragm means sealingly secured in the reservoir for corresponding movement in response to a decrease in the level of brake fluid in the reservoir and for separating a brake fluid containing portion of the reservoir from an air containing portion;

the diaphragm including normally closed interstice means formed therein said interstice means being openable for permitting air in the air containing portion of the reservoir to be drawn into the fluid containing portion under preselected conditions; and said preselected conditions being a difference in pressure between the two sides thereof.

9. The system of claim 8 wherein the brake fluid level sensor means comprises:

an elongated portion; and float means movably mounted on the elongated portion and buoyant in the brake fluid responsive for maintaining a constant position with respect to the level of brake fluid in the reservoir.

10. The system of claim 9, and further including:

means mounted on the sensor and concentrically spaced around the elongated portion and the float means for permitting movement of the float relative to the elongated portion and for maintaining the movement of the diaphragm spaced from interferring engagement with the elongated portion and the float means.

11. A brake fluid reservoir comprising:

a main body portion;

a cap mounted on the main body;

diaphragm means sealingly secured in the reservoir for corresponding movement in response to a decrease in the level of brake fluid in the reservoir and for separating a brake fluid containing portion of the reservoir from an air containing portion;

normally closed interstice means formed in the diaphragm means, said interstice means being openable for permitting air in the air containing portion to pass into the brake fluid containing portion under preselected conditions; and said preselected conditions being a difference in pressure between the two sides thereof.

* * * * *

UNITED STATES PATENT OFFICE
CERTIFICATE OF CORRECTION

Patent No. 4,058,694　　　　Dated November 15, 1977

Inventor(s) Robert O. Tuegel

It is certified that error appears in the above-identified patent and that said Letters Patent are hereby corrected as shown below:

Column 5, line 63, before "containing" insert the following:
-- in the reservoir and for separating a brake fluid --.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*

Disclaimer 4,058,694.—*Robert O. Tuegel*, St. Louis County, Mo. MASTER CYLINDER RESERVOIR WITH VACUUM RELIEF DIAPHRAGM AND GUARDED FLUID LEVEL SENSOR. Patent dated Nov. 15, 1977. Disclaimer filed Apr. 3, 1980, by the assignee, *Wagner Electric Corporation*.

Hereby enters this disclaimer to claims 3, 4, 8, 9 and 11 of said patent.
[*Official Gazette July 8, 1980.*]